US012567657B2

(12) United States Patent
Yamamoto et al.

(10) Patent No.: US 12,567,657 B2
(45) Date of Patent: Mar. 3, 2026

(54) CONNECTING LEAD AND BATTERY

(71) Applicant: KABUSHIKI KAISHA TOSHIBA, Tokyo (JP)

(72) Inventors: Kuniaki Yamamoto, Yokohama Kanagawa (JP); Tatsuya Shinoda, Yokohama Kanagawa (JP); Nobuyasu Negishi, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 655 days.

(21) Appl. No.: 17/942,047

(22) Filed: Sep. 9, 2022

(65) Prior Publication Data

US 2023/0006312 A1 Jan. 5, 2023

Related U.S. Application Data

(63) Continuation of application No. PCT/JP2020/010528, filed on Mar. 11, 2020.

(51) Int. Cl.
H01M 50/533 (2021.01)
H01M 10/04 (2006.01)
(Continued)

(52) U.S. Cl.
CPC ..... H01M 50/533 (2021.01); H01M 10/0413 (2013.01); H01M 50/103 (2021.01); H01M 50/543 (2021.01); *H01M 2220/20* (2013.01)

(58) Field of Classification Search
CPC ............. H01M 50/533; H01M 50/543; H01M 50/552; H01M 50/553; H01M 50/555;
(Continued)

(56) References Cited

U.S. PATENT DOCUMENTS

2006/0063068 A1 3/2006 Cheon et al.
2011/0039152 A1* 2/2011 Kim ...................... H01M 50/48
429/178
(Continued)

FOREIGN PATENT DOCUMENTS

EP 2584630 B1 * 4/2016 ........ H01M 10/0525
JP 2006-093122 A 4/2006
(Continued)

OTHER PUBLICATIONS

JP 2006236790 A machine translation (Year: 2006).*
(Continued)

*Primary Examiner* — Jonathan G Leong
*Assistant Examiner* — John S Medley
(74) *Attorney, Agent, or Firm* — Foley & Lardner LLP

(57) ABSTRACT

In one embodiment, a connecting lead connecting between a current collecting tab of an electrode group and an electrode terminal in a battery is provided. The connecting lead includes a top plate portion and a leg portion, a leg portion is bent relative to the top plate portion to one side in a thickness direction of the top plate portion, and a bend line at a bend position to the top plate portion is along a width direction of the top plate portion. The leg portion includes an extension portion located apart from the bend position to the top plate portion. The extension portion includes, on an outer surface, a side face relaying between a pair of main faces and facing one side in the width direction of the top plate portion. The side face is joined to the current collecting tab.

6 Claims, 6 Drawing Sheets

(51) Int. Cl.
*H01M 50/103* (2021.01)
*H01M 50/543* (2021.01)

(58) Field of Classification Search
CPC ............ H01M 50/557; H01M 50/559; H01M 50/103; H01M 10/0413
USPC ........................................................ 429/178
See application file for complete search history.

(56) References Cited

U.S. PATENT DOCUMENTS

| | | | |
|---|---|---|---|
| 2011/0076553 A1* | 3/2011 | Kameda ............... | H01M 50/562 |
| | | | 429/181 |
| 2011/0159356 A1 | 6/2011 | Tozuka et al. | |
| 2013/0252080 A1 | 9/2013 | Naganawa et al. | |
| 2014/0023899 A1 | 1/2014 | Tanaka | |
| 2015/0207125 A1* | 7/2015 | Kishimoto .......... | H01M 50/538 |
| | | | 429/129 |
| 2017/0294684 A1 | 10/2017 | Sato | |
| 2017/0358790 A1* | 12/2017 | Kishimoto .......... | H01M 50/538 |

FOREIGN PATENT DOCUMENTS

| | | | | |
|---|---|---|---|---|
| JP | 2006-236790 A | 9/2006 | | |
| JP | 4292365 B2 | 7/2009 | | |
| JP | 2011-071109 A | 4/2011 | | |
| JP | 2014-022179 A | 2/2014 | | |
| JP | 2015041615 A * | 3/2015 | ............ | Y02E 60/10 |
| JP | 2016-058379 A | 4/2016 | | |
| JP | 2018-139215 A | 9/2018 | | |
| WO | WO-2010/001975 A1 | 1/2010 | | |
| WO | WO-2017/159760 A1 | 9/2017 | | |

OTHER PUBLICATIONS

JP 2015041615 A mach. trans. (Year: 2015).*
EP Search Report for EP Appl. Ser. No. 20924438 dated Jul. 5, 2024 (6 pages).
International Search Report issued in International Patent Application No. PCT/JP2020/010528 dated Jun. 16, 2020.

* cited by examiner

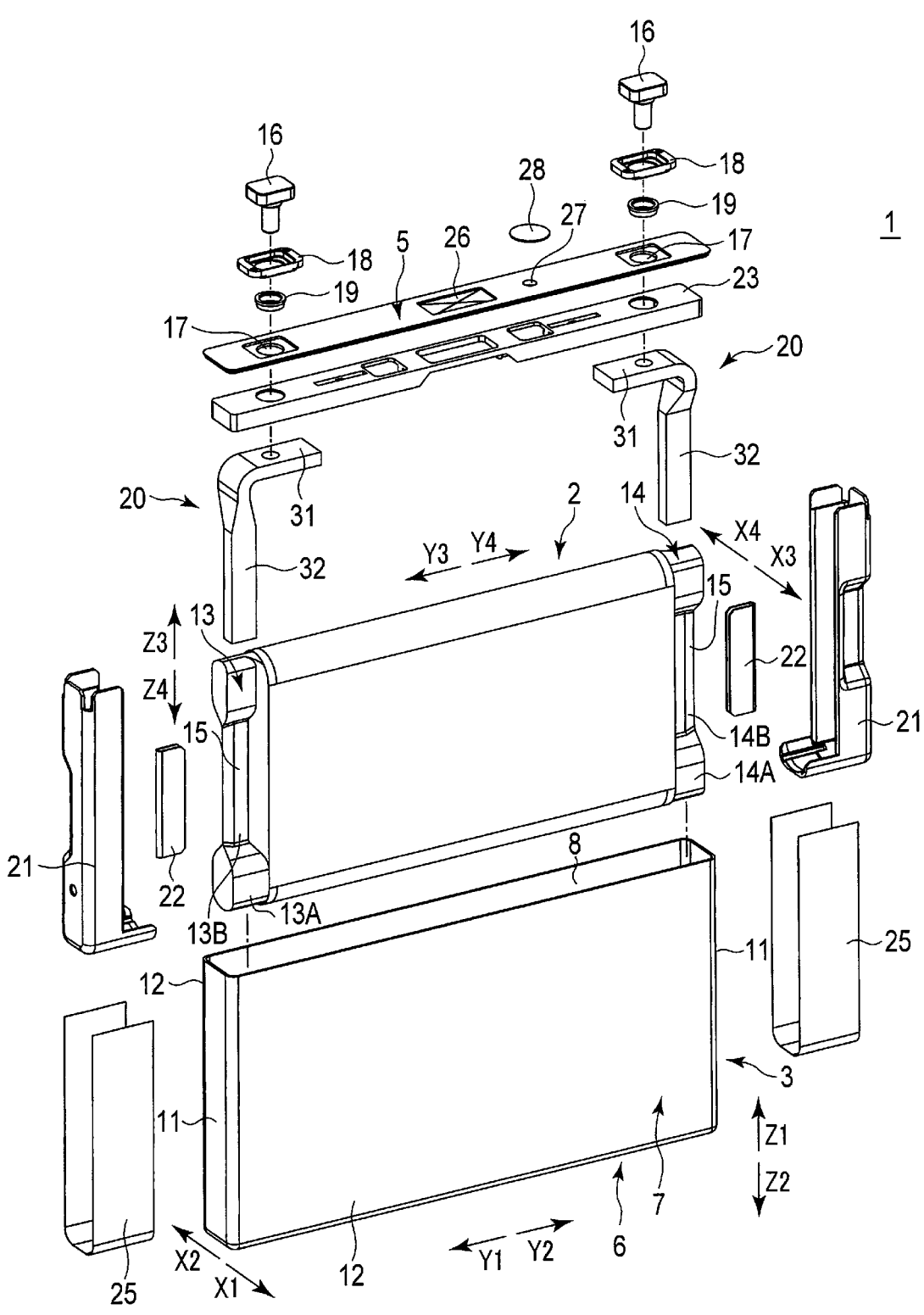
F I G. 2

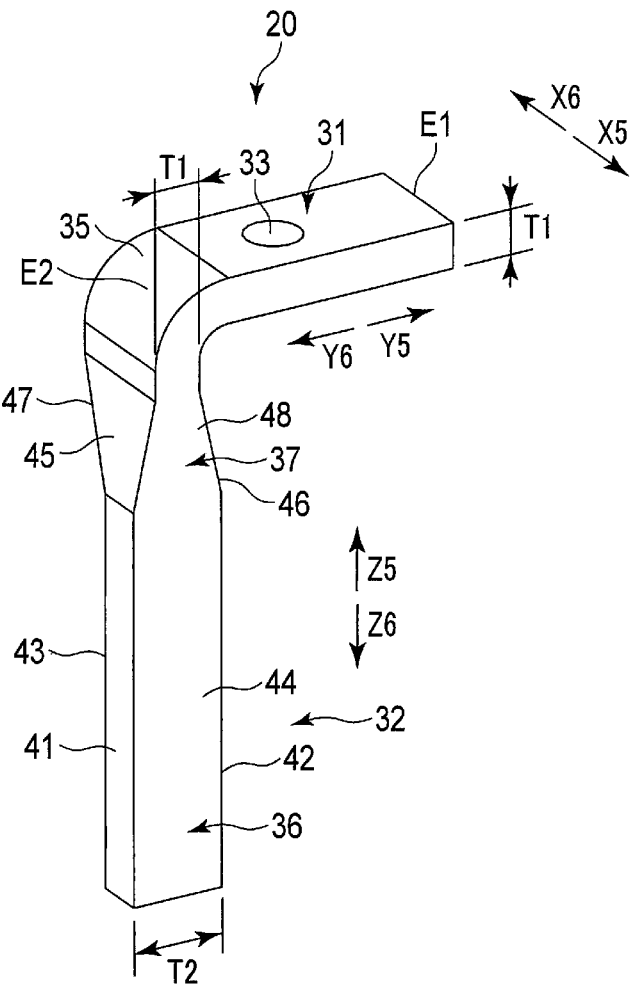
F I G. 3

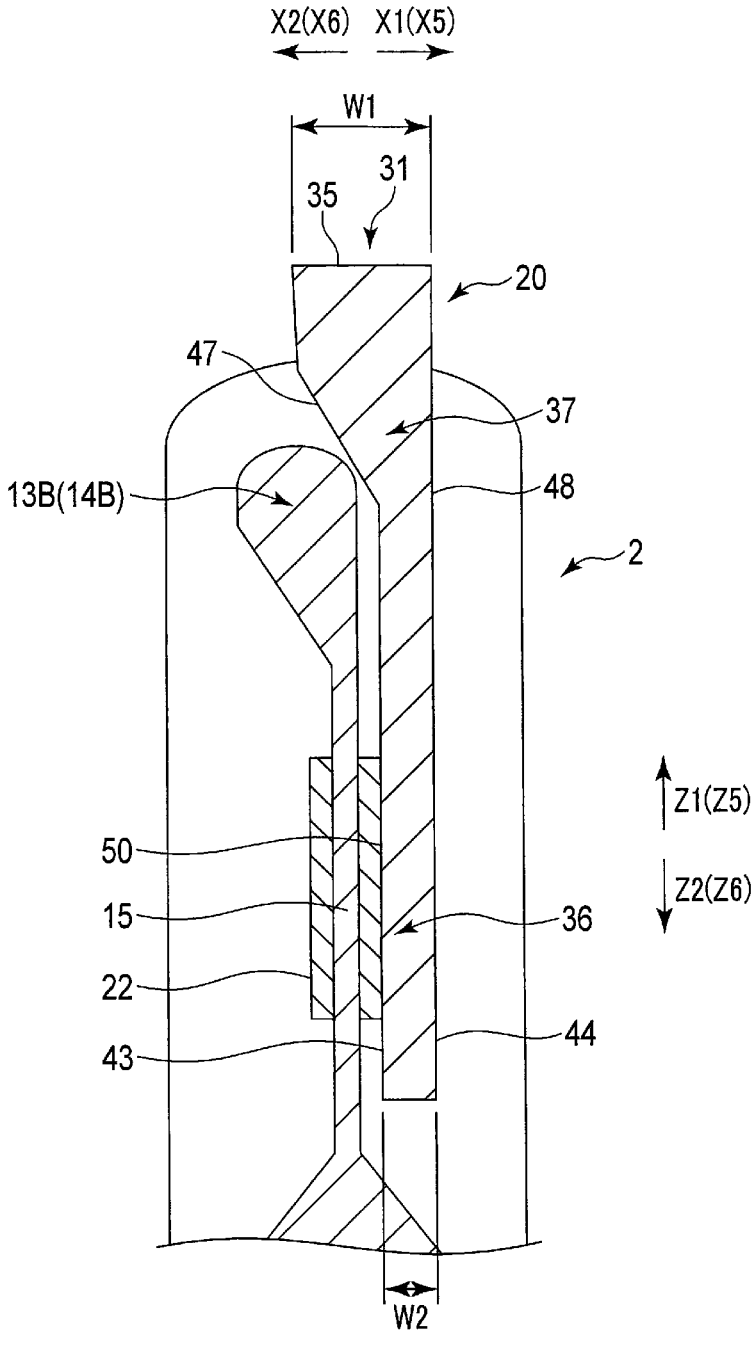
F I G. 4

CONNECTING LEAD AND BATTERY

CROSS-REFERENCE TO RELATED APPLICATIONS

This is a Continuation Application of PCT Application No. PCT/JP2020/010528, filed Mar. 11, 2020, the entire contents of which are incorporated herein by reference.

FIELD

Embodiments described herein relate to a connecting lead and a battery.

BACKGROUND

Along with the progress of electronic devices, such as mobile phones and personal computers, miniaturization and weight reduction of batteries, such as secondary batteries, for use in such electronic devices have been required. Examples of a secondary battery that is compact and lightweight and is high in energy density include a lithium-ion secondary battery. Meanwhile, as large-size and high-capacity power supplies for vehicles, such as an electric automobile, a hybrid automobile, an electric motorcycle, and a forklift, secondary batteries, such as a lead-acid battery and a nickel metal hydride battery, are used. In recent years, as a large-size and high-capacity power supply for vehicles, a lithium-ion secondary battery high in energy density has been developed for adoption. In development of a lithium-ion secondary battery for vehicles, achievement of a large-size and high-capacity battery is required in addition to achievement of a long-life battery and achievement of an improvement in safety.

There is a battery, such as a lithium-ion secondary battery, in which an electrode group including a positive electrode and a negative electrode is housed in the inner cavity of a container. In the battery, the container includes a bottom wall and a surrounding wall, and the inner cavity of the container is open on the side opposite to the bottom wall in its height direction. Then, a lid member is attached to the surrounding wall of the container, so that the opening of the inner cavity is covered with the lid member. In the battery, an electrode terminal is attached to the outer surface of the lid member, and a current collecting tab protrudes outward from the electrode group in the inner cavity. Then, the current collecting tab is electrically connected to the electrode terminal through a connecting lead (lead).

Regarding such a battery as described above, for example, in response to vibration of machinery equipped with the battery, the connecting lead receives, for example, an impact from outside. Thus, the connecting lead is required to have a high impact resistance against an impact or the like. The connecting lead forms a current path between the electrode group and the electrode terminal. Thus, the connecting lead is required to have a low electric resistance.

BRIEF DESCRIPTION OF THE DRAWINGS

FIG. 2 is a schematic exploded perspective view of the battery according to the first embodiment.

FIG. 3 is a perspective view of the configuration of a connecting lead according to the first embodiment.

FIG. 4 is a schematic sectional view of the joint portion of the connecting lead according to the first embodiment to a current collecting tab and the vicinity thereof.

DETAILED DESCRIPTION

According to one embodiment, a connecting lead establishing a connection between a current collecting tab of an electrode group and an electrode terminal in a battery is provided. The connecting lead includes a top plate portion and a leg portion, a leg portion is bent with respect to the top plate portion to one side in a thickness direction of the top plate portion, and a bend line at a bend position to the top plate portion is along a width direction of the top plate portion. The leg portion includes an extension portion located apart from the bend position to the top plate portion. The extension portion includes: a first main face on an outer surface, the first main face facing one side in a cross direction intersecting both the width direction of the top plate portion and the thickness direction of the top plate portion; a second main face on the outer surface, the second main face facing a side opposite to the side that the first main face faces; and a side face on the outer surface, the side face serving as a relay between the first main face and the second main face, the side face facing one side in the width direction of the top plate portion. The side face is to be joined to the current collecting tab.

According to one embodiment a battery includes the above described connecting lead, a container, an electrode group, a lid member and an electrode terminal. The container includes a bottom wall and a surrounding wall, and the container having an inner cavity in which the connecting lead is disposed, the inner cavity being defined by the bottom wall and the surrounding wall. The electrode group includes a positive electrode and a negative electrode, and the electrode group includes a current collecting tab joined to the connecting lead through the side face of the extension portion of the leg portion. The lid member is attached to the surrounding wall through an end portion opposite the bottom wall, and the lid member covers an opening of the inner cavity of the container. The electrode terminal is attached to an outer surface of the lid member, and the electrode terminal is connected to the top plate portion of the connecting lead.

Embodiments will be described below with reference to the drawings.

First Embodiment

Figure 1:
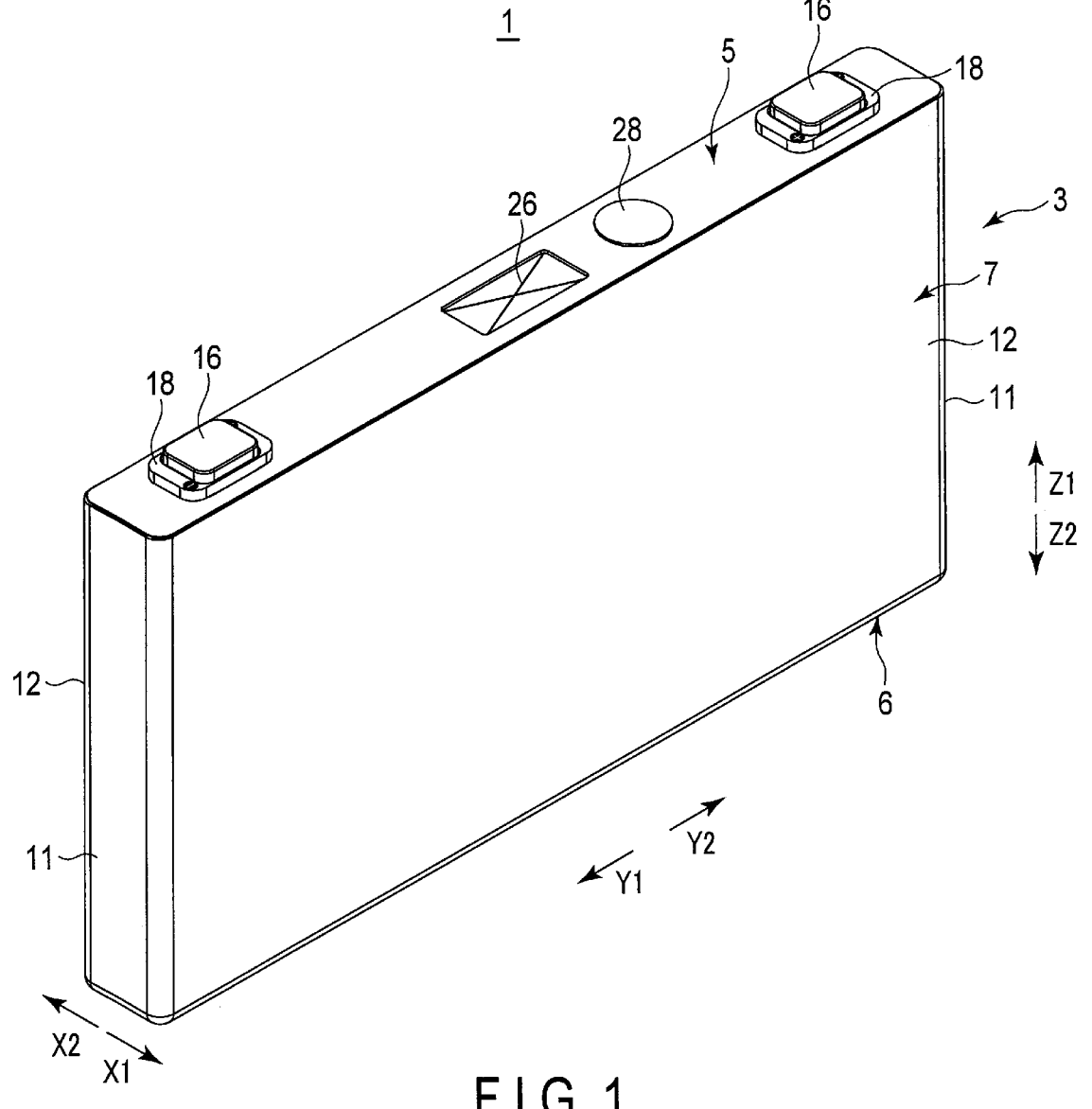
FIG. 1 is a schematic perspective view of a battery according to a first embodiment.

FIGS. 1 and 2 illustrate a battery 1 according to a first embodiment. As illustrated in FIGS. 1 and 2, the battery 1 includes an electrode group 2, a container 3, and a lid member 5. The container 3 and the lid member 5 are each made of metal, such as aluminum, an aluminum alloy, iron, copper, or stainless steel. Here, the battery 1 is defined in terms of a depth direction (direction indicated by an arrow X1 or X2), a lateral direction (direction indicated by an arrow Y1 or Y2) intersecting (orthogonally or substantially orthogonally) the depth direction, and a height direction (direction indicated by an arrow Z1 or Z2) intersecting (orthogonally or substantially orthogonally) both the depth direction and the lateral direction. The battery 1 and the container 3 each have its dimension in the depth direction smaller than its dimension in the lateral direction and its dimension in the height direction.

The container 3 includes a bottom wall 6 and a surrounding wall 7. An inner cavity 8 in which the electrode group 2 is housed is defined by the bottom wall 6 and the surrounding wall 7. The container 3 has the inner cavity 8 that is open on the side opposite to the side on which the bottom wall 6 is located in the height direction. The surrounding wall 7 includes a pair of side walls 11 and a pair of side walls 12. The pair of side walls 11 are opposed to each other in the lateral direction with the inner cavity 8 being interposed therebetween. The pair of side walls 12 are opposed to each other in the depth direction with the inner cavity 8 being interposed therebetween. The side walls 11 each extend continuously along the depth direction between the side walls 12. The side walls 12 each extend continuously along the lateral direction between the side walls 11. The lid member 5 is attached to the surrounding wall 7 through an end portion opposite the bottom wall 6. Thus, the lid member 5 covers the opening of the inner cavity 8 of the container 3. The lid member 5 and the bottom wall 6 ara opposed to each other in the height direction with the inner cavity 8 being interposed therebetween.

The electrode group 2 includes a positive electrode 13 and a negative electrode 14. The electrode group 2 includes a separator (not illustrated) interposed between the positive electrode 13 and the negative electrode 14. The separator is made of a material having an electrical insulation property and electrically insulates the positive electrode 13 against the negative electrode 14.

The positive electrode 13 includes a positive electrode current collector 13A, such as positive electrode current collecting foil, and a positive electrode active material-containing layer (not illustrated) supported on the surface of the positive electrode current collector 13A. For example, the positive electrode current collector 13A is made of aluminum foil or aluminum-alloy foil and has a thickness of approximately 10 to 20 μm, but this is not limiting. The positive electrode active material-containing layer contains a positive electrode active material and may optionally contain a binder and an electro-conductive agent. Examples of the positive electrode active material include, but are not limited to, an oxide, a sulfide, and a polymer that can occlude and discharge lithium ions. The positive electrode current collector 13A includes a positive electrode current collecting tab 13B as a portion on which no positive electrode active material-containing layer is supported.

The negative electrode 14 includes a negative electrode current collector 14A, such as negative electrode current collecting foil, and a negative electrode active material-containing layer (not illustrated) supported on the surface of the negative electrode current collector 14A. For example, the negative electrode current collector 14A is made of aluminum foil, aluminum-alloy foil, or copper foil and has a thickness of approximately 10 to 20 μm, but this is not limiting. The negative electrode active material-containing layer contains a negative electrode active material and may optionally contain a binder and an electro-conductive agent. Examples of the negative electrode active material include, but are not limited to, a metal oxide, a metal sulfide, a metal nitride, and a carbonic material that can occlude and discharge lithium ions. The negative electrode current collector 14A includes a negative electrode current collecting tab 14B as a portion on which no negative electrode active material-containing layer is supported.

For example, in the electrode group 2 exemplified in FIG. 2, the positive electrode 13, the negative electrode 14, and the separator are wounded around a winding axis with the separator sandwiched between the positive electrode active material-containing layer and the negative electrode active material-containing layer. In another example, the electrode group 2 has a stack structure in which a plurality of positive electrodes 13 and a plurality of negative electrodes 14 are alternately stacked with a separator provided between each positive electrode 13 and any adjacent negative electrode 14. In the electrode group 2, the positive electrode current collecting tab 13B protrudes with respect to the negative electrode 14 and the separator. Then, with respect to the positive electrode 13 and the separator, the negative electrode current collecting tab 14B protrudes in the direction opposite to the direction in which the positive electrode current collecting tab 13B protrudes.

The electrode group 2 is defined in terms of a width direction (direction indicated by an arrow Z3 or Z4) intersecting (orthogonally or substantially orthogonally) the protruding direction of the current collecting tabs 13B and 14B (direction indicated by an arrow Y3 or Y4) and a thickness direction (direction indicated by an arrow X3 or X4) intersecting both the protruding direction of the current collecting tabs 13B and 14B and the width direction. Then, the electrode group 2 has its dimension in the thickness direction smaller than its dimension in the protruding direction of the current collecting tabs 13B and 14B and its dimension in the width direction. Thus, the electrode group 2 has a flat shape. The positive electrode current collecting tab 13B and the negative electrode current collecting tab 14B each include a sheaf portion 15 of a sheaf of belt-like portions.

In the present embodiment, the electrode group 2 is disposed in the inner cavity 8 with its width direction identical to or substantially identical to the height direction of the battery 1 and its thickness direction identical to or substantially identical to the depth direction of the battery 1. Then, in the inner cavity 8 of the container 3, the positive electrode current collecting tab 13B protrudes to one side in the lateral direction with respect to the negative electrode 14 and the separator. The negative electrode current collecting tab 14B protrudes to the side opposite to the side to which the positive electrode current collecting tab 13B protrudes in the lateral direction, with respect to the positive electrode 13 and the separator.

In the inner cavity 8, the electrode group 2 retains (is impregnated with) an electrolyte solution (not illustrated). The electrolyte solution may be a nonaqueous electrolyte solution obtained by dissolving an electrolyte in an organic solvent or may be an aqueous electrolyte solution, such as an aqueous solution. Instead of the electrolyte solution, a gel electrolyte or a solid electrolyte may be used. In a case where a solid electrolyte is used as an electrolyte, in the electrode group, instead of the separator, the solid electrolyte is interposed between the positive electrode 13 and the negative electrode 14. In this case, the solid electrolyte electrically insulates the positive electrode 13 against the negative electrode 14.

In the battery 1, a pair of electrode terminals 16 is attached to the outer surface (upper face) of the lid member 5. The electrode terminals 16 are made of a conductive material, such as metal. One of the electrode terminals 16 is a positive electrode terminal for the battery 1 and the other of the electrode terminals 16 is a negative electrode terminal for the battery 1. The lid member 5 is provided with a pair of through holes 17. Each of the through holes 17 penetrates through the lid member 5 in the height direction of the battery 1. An insulating member 18 is provided between each of the electrode terminals 16 and the lid member 5. An insulating gasket 19 is disposed at each of the through holes 17. The electrode terminals 16 are each electrically insulated against the lid member 5 and the container 3 by the insulating member 18 and the insulating gasket 19.

A pair of connecting leads 20 is disposed in the inner cavity 8 of the container 3. The positive electrode current collecting tab 13B of the electrode group 2 is electrically connected to the positive electrode terminal that is the corresponding one of the electrode terminals 16 through a positive-electrode-side connecting lead (positive electrode lead) that is the corresponding one of the connecting leads (leads) 20. The negative electrode current collecting tab 14B of the electrode group 2 is electrically connected to the negative electrode terminal that is the corresponding one of the electrode terminals 16 through a negative-electrode-side connecting lead (negative electrode lead) that is the corresponding one of the connecting leads 20. The connecting leads 20 are each made of a conductive material, such as metal. Examples of a conductive material for the connecting leads 20 include aluminum, stainless steel, copper, and iron.

In the present embodiment, the current collecting tabs 13B and 14B are each joined to the corresponding one of the connecting leads 20 through a backup lead 22. The current collecting tabs 13B and 14B each have the sheaf portion 15 pinched by the backup lead 22. Then, the current collecting tabs 13B and 14B are each joined to the corresponding one of the connecting leads 20 through the sheaf portion 15 pinched by the backup lead 22.

In the inner cavity 8 of the container 3, a pair of insulating guards 21 and an electrode holder 23 are disposed. The insulating guards 21 are each made of a material having an electrical insulation property. The positive-electrode-side connecting lead that is one of the connecting leads 20 and the positive electrode current collecting tab 13B are each prevented from contact with the container 3 by the corresponding one of the insulating guards 21, resulting in electrical insulation against the container 3. The negative-electrode-side connecting lead that is one of the connecting leads 20 and the negative electrode current collecting tab 14B are each prevented from contact with the container 3 by the corresponding one of the insulating guards 21, resulting in electrical insulation against the container 3. The insulating guards 21 are each fixed to the electrode group 2 by an insulating tape 25. The insulating tape 25 is made of a material having an electrical insulation property.

The electrode holder 23 is disposed between the electrode group 2 and the lid member 5 in the height direction of the battery 1. The electrode holder (inner insulating member) 23 is made of a material having an electrical insulation property. The positive electrode current collecting tab 13B, the negative electrode current collecting tab 14B, and the pair of connecting leads 20 are prevented from contact with the lid member 5 by the electrode holder 23, resulting in electrical insulation against the lid member 5.

In the example of FIGS. 1 and 2, the lid member 5 has a gas discharge valve 26 and a liquid inlet 27. Then, a sealing plate 28 for covering the liquid inlet 27 is welded on the outer surface of the lid member 5. Note that, for example, the gas discharge valve 26 and the liquid inlet 27 are not necessarily provided to the battery 1.

FIG. 3 illustrates the configuration of a connecting lead 20. FIG. 4 illustrates the joint portion of the connecting lead 20 to the current collecting tab (13B or 14B) and the vicinity thereof. As illustrated in FIGS. 3 and 4, the connecting leads 20 each include a top plate portion 31 and a leg portion 32.

The top plate portion 31 has extension ends E1 and E2. The top plate portion 31 extends from the extension end (first extension end) E1 to the extension end (second extension end) E2 along an extending direction (direction indicated by an arrow Y5 or Y6). The top plate portion 31 is defined in terms of a width direction (direction indicated by an arrow X5 or X6) intersecting (orthogonally or substantially orthogonally) the extending direction (longitudinal direction) and a thickness direction (direction indicated by an arrow Z5 or Z6) intersecting both the extending direction (longitudinal direction) and the width direction. The connecting leads 20 are each defined in that the extending direction of the top plate portion 31 is a cross direction intersecting both the width direction and thickness direction of the top plate portion 31. The top plate portion 31 has a through hole 33 penetrating through the top plate portion 31 in the thickness direction.

The connecting leads 20 according to the present embodiment each have a single leg portion 32. The leg portion 32 includes a leg connecting portion 35 connected to the extension end E2 of the top plate portion 31. At the leg connecting portion 35 (extension end E2) as a bend position, the leg portion 32 bends with respect to the top plate portion 31. The leg portion 32 bends with respect to the top plate portion 31 to one side in the thickness direction of the top plate portion 31. Thus, the leg portion 32 protrudes with respect to the top plate portion 31 to the one side in the thickness direction of the top plate portion 31. The bend line of the leg portion 32 at the bend position to the top plate portion 31 is along the width direction of the top plate portion 31. In the present embodiment, the bend angle of the leg portion 32 to the top plate portion 31 at the leg connecting portion 35 (bend position) is 90 degrees or approximately 90 degrees.

The leg portion 32 extends straight or substantially straight from the bend position (leg connecting portion 35) to the top plate portion 31 to a protrusion end with respect to the top plate portion 31. That is, the leg portion 32 extends to the protrusion end with no bend, except for the bend at the leg connecting portion 35. Then, the leg portion 32 extends to the protrusion end along the thickness direction of the top plate portion 31. The width direction (plate width direction) of the leg portion 32 is identical to or substantially identical to the width direction (plate width direction) of the top plate portion 31. Then, the thickness direction (plate thickness direction) of the leg portion 32 intersects (orthogonally or substantially orthogonally) both the width direction of the top plate portion 31 and the thickness direction of the top plate portion 31. Therefore, the thickness direction of the leg portion 32 is identical to or substantially identical to the extending direction (longitudinal direction) of the top plate portion 31 and is identical to or substantially identical to the cross direction of the connecting lead 20.

The leg portion 32 includes an extension portion 36 located apart from the leg connecting portion 35, on the side opposite to the top plate portion 31. The extension portion 36 is provided apart from the bend position of the leg portion 32 to the top plate portion 31 and is provided farther from the top plate portion 31 than the leg connecting portion 35 is. In the present embodiment, the extension portion 36 forms the protrusion end of the leg portion 32 with respect to the top plate portion 31.

The leg portion 32 has a profile varying portion 37 at the relay portion between the leg connecting portion 35 (bend position) and the extension portion 36. In the present embodiment, the profile varying portion 37 is adjacent to the extension portion 36, on the side on which the top plate portion 31 is located. Here, defined will be the extending direction of the leg portion 32 from the leg connecting portion 35 to the protrusion end. The extending direction of the leg portion 32 intersects (orthogonally or substantially orthogonally) both the width direction of the leg portion 32 and the thickness direction of the leg portion 32. In the profile varying portion 37, the profile of the leg portion 32 orthogonal to or substantially orthogonal to the extending direction varies along the extending direction of the leg portion 32. Then, in the profile varying portion 37, the dimension (width) of the leg portion 32 in the width direction of the leg portion 32 and the dimension (thickness) of the leg portion 32 in the thickness direction of the leg portion 32 vary along the extending direction of the leg portion 32.

The outer surface of the extension portion 36 includes a pair of main faces 41 and 42 and a pair of side faces 43 and 44. The main face (first main face) 41 faces one side in the cross direction of the connecting lead 20, namely, one side in the thickness direction of the leg portion 32. The main face (second main face) 42 faces the side opposite to the side that the main face 41 faces in the cross direction of the connecting lead 20. Then, the main face 42 is disposed apart from the main face 41 in the cross direction of the connecting lead 20. The distance between the main faces 41 and 42 corresponds to the dimension of the extension portion 36 in the thickness direction of the leg portion 32 (cross direction of the connecting lead 20).

The side faces 43 and 44 each extend continuously along the thickness direction of the leg portion 32 from the main face 41 to the main face 42. Thus, the side faces 43 and 44 each serve as a relay between the main faces 41 and 42. The side face (first side face) 43 is connected to either edge of the main face 41 and is connected to either edge of the main face 42. The side face (second side face) 44 is connected to the edge on the side opposite to the side of connection with the side face 43 of the main face 41, and is connected to the edge on the side opposite to the side of connection with the side face 43 of the main face 42. The side face 43 faces one side in the width direction of the leg portion 32, namely, one side in the width direction of the top plate portion 31. The side face 44 faces the side opposite to the side that the side face 43 faces in the width direction of the leg portion 32. Then, the side face 44 is disposed apart from the side face 43 in the width direction of the leg portion 32. The distance between the side faces 43 and 44 corresponds to the dimension of the extension portion 36 in the width direction of the leg portion 32 (width direction of the top plate portion 31).

The outer surface of the profile varying portion 37 includes a pair of relay main faces 45 and 46 and a pair of relay side faces 47 and 48. The relay main face (first relay main face) 45 is adjacent to the main face 41, on the side on which the top plate portion 31 (leg connecting portion 35) is located. The relay main face 45 faces the side that the main face 41 faces in the cross direction of the connecting lead 20. The relay main face (second relay main face) 46 is adjacent to the main face 42, on the side on which the top plate portion 31 is located. The relay main face 46 faces the side opposite to the side that the relay main face 45 faces in the cross direction of the connecting lead 20. Then, the relay main face 46 is disposed apart from the relay main face 45 in the cross direction of the connecting lead 20. The profile varying portion 37 is defined in that the dimension between the relay main faces 45 and 46 is the dimension in the thickness direction of the leg portion 32 (cross direction of the connecting lead 20).

The relay side face (first relay side face) 47 is adjacent to the side face 43, on the side on which the top plate portion

31 (leg connecting portion 35) is located. The relay side face 47 faces the side that the side face 43 faces in the width direction of the leg portion 32. The relay side face (second relay side face) 48 is adjacent to the side face 44, on the side on which the top plate portion 31 is located. The relay side face 48 faces the side opposite to the side that the relay side face 47 faces in the width direction of the leg portion 32. Then, the relay side face 48 is disposed apart from the relay side face 47 in the width direction of the leg portion 32. The profile varying portion 37 is defined in that the dimension between the relay side faces 47 and 48 is the dimension in the width direction of the leg portion 32 (width direction of the top plate portion 31).

Here, in the top plate portion 31, the dimension (width) in the width direction is a dimension (first dimension) W1 and is uniform or substantially uniform from the extension end E1 to the extension end E2. Then, in the leg portion 32, the dimension (width) in the width direction (width direction of the top plate portion 31) is the dimension W1 and is uniform or substantially uniform between the leg connecting portion 35 and the profile varying portion 37. Therefore, the dimension of the leg portion 32 in the width direction in a portion between the leg connecting portion 35 and the profile varying portion 37 is identical to or substantially identical to the dimension of the top plate portion 31 in the width direction. Then, at the bend position of the leg portion 32 to the top plate portion 31, the leg portion 32 has a size identical to or substantially identical to the dimension (first dimension) W1 in the width direction of the top plate portion 31 (width direction of the leg portion 32).

In the extension portion 36, the dimension (width) of the leg portion 32 in the width direction (width direction of the top plate portion 31) is a dimension (second dimension) W2 smaller than the dimension (first dimension) W1 and is uniform or substantially uniform. Therefore, in the extension portion 36, the distance between the side faces 43 and 44 is identical to or substantially identical to the dimension W2. In the profile varying portion 37, a closer part to the extension portion 36 has a smaller dimension of the leg portion 32 in the width direction (width direction of the top plate portion 31). That is, in the profile varying portion 37 as a width varying portion, along with approach to the extension portion 36, the dimension of the leg portion 32 in the width direction reduces from the dimension W1 to the dimension W2. Therefore, in the profile varying portion 37, along with approach to the extension portion 36, the dimension (distance) between the relay side faces 47 and 48 reduces.

In the top plate portion 31, the dimension (thickness) in the thickness direction is a dimension (third dimension) T1 and is uniform or substantially uniform from the extension end E1 to the extension end E2. Then, in the leg portion 32, the dimension (thickness) in the thickness direction (cross direction of the connecting lead 20) is the dimension T1 and is uniform or substantially uniform between the leg connecting portion 35 and the profile varying portion 37. Therefore, the dimension of the leg portion 32 in the cross direction of the connecting lead 20 in the portion between the leg connecting portion 35 and the profile varying portion 37 is identical to or substantially identical to the dimension of the top plate portion 31 in the thickness direction. Then, at the bend position of the leg portion 32 to the top plate portion 31, the leg portion 32 has a size identical to or substantially identical to the dimension (third dimension) T1 in the thickness direction of the leg portion 32.

In the extension portion 36, the dimension (thickness) of the leg portion 32 in the thickness direction (cross direction of the connecting lead 20) is a dimension (fourth dimension) T2 larger than the dimension (third dimension) T1 and is uniform or substantially uniform. Therefore, in the extension portion 36, the distance between the main faces 41 and 42 is identical to or substantially identical to the dimension T2. In the profile varying portion 37, a closer part to the extension portion 36 has a larger dimension of the leg portion 32 in the thickness direction (cross direction of the connecting lead 20). That is, in the profile varying portion 37 as a dimension varying portion (thickness varying portion), along with approach to the extension portion 36, the dimension of the leg portion 32 in the thickness direction increases from the dimension T1 to the dimension T2. Therefore, in the profile varying portion 37, along with approach to the extension portion 36, the dimension (distance) between the relay main faces 45 and 46 increases.

Note that, in an example, the dimension W1 is 4.0 to 10.0 mm. Then, the dimension W2 is smaller by 1.0 to 7.0 mm than the dimension W1. In another example, the dimension T1 is 0.5 to 5.0 mm. Then, the dimension T2 is larger by 1.0 to 5.0 mm than the dimension T1.

In the present embodiment, the main faces 41 and 42 and the side faces 43 and 44 each extend parallel to or substantially parallel to the thickness direction of the top plate portion 31. Then, the relay main face 45 extends obliquely with respect to the thickness direction of the top plate portion 31, namely, obliquely with respect to the main face 41. The relay main face 45 is oblique with respect to the main face 41 such that a closer part to the extension portion 36 (main face 41) is further apart from the relay main face 46. The relay main face 46 extends obliquely with respect to the thickness direction of the top plate portion 31, namely, obliquely with respect to the main face 42. The relay main face 46 is oblique with respect to the main face 42 such that a closer part to the extension portion 36 (main face 42) is further apart from the relay main face 45. Due to such formation of the relay main faces 45 and 46 as described above, in the profile varying portion 37, a closer part to the extension portion 36 has a larger dimension of the leg portion 32 in the thickness direction (cross direction of the connecting lead 20).

The relay side face 47 extends obliquely with respect to the thickness direction of the top plate portion 31, namely, obliquely with respect to the side face 43. The relay side face 47 is oblique with respect to the side face 43 such that a closer part to the extension portion 36 (side face 43) is closer to the relay side face 48. The relay side face 48 is parallel to or substantially parallel to the thickness direction of the top plate portion 31. Then, for example, without any step between the relay side face 48 and the side face 44, the relay side face 48 and the side face 44 are disposed so as to be flush with or substantially flush with each other. Due to such formation of the relay side faces 47 and 48 as described above, in the profile varying portion 37, a closer part to the extension portion 36 has a smaller dimension of the leg portion 32 in the width direction (width direction of the top plate portion 31).

In the top plate portion 31 according to the present embodiment, the hardness is hardness (first hardness) C1 and is uniform or substantially uniform from the extension end E1 to the extension end E2. Then, in the leg portion 32, the hardness is the hardness C1 and is uniform or substantially uniform between the leg connecting portion 35 and the profile varying portion 37. Therefore, the hardness of the leg portion 32 in the portion between the leg connecting portion 35 and the profile varying portion 37 is identical to or substantially identical to the hardness of the top plate portion 31. In the extension portion 36, the hardness of the leg portion 32 is hardness (second hardness) C2 higher than the hardness (first hardness) C1 and is uniform or substantially uniform. In the profile varying portion 37, a closer part to the extension portion 36 has a higher hardness of the leg portion 32. That is, in the profile varying portion 37 as a hardness varying portion, along with approach to the extension portion 36, the hardness of the leg portion 32 increases from the hardness C1 to the hardness C2.

Figure 5:
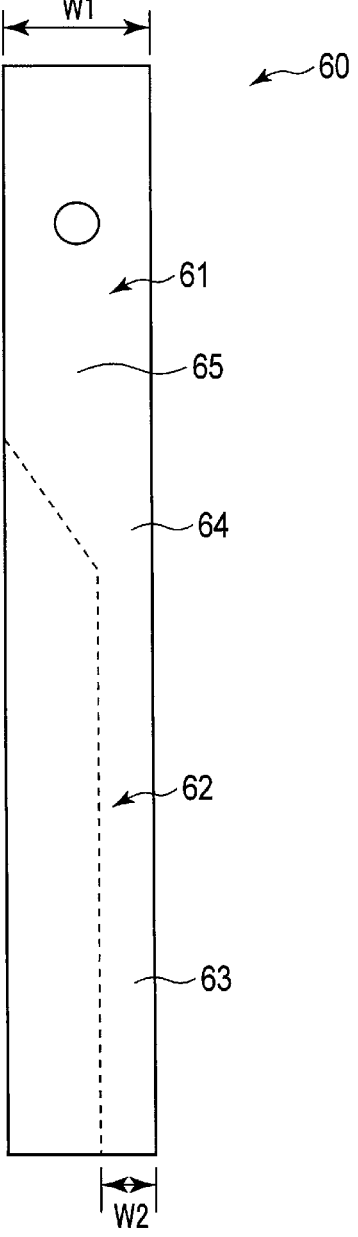
FIG. 5 is an explanatory schematic view of an exemplary method of manufacturing the connecting lead according to the first embodiment.

FIG. 5 is an explanatory view of an exemplary method of manufacturing a connecting lead 20. In the example of FIG. 5, a connecting lead 20 is formed with a single plate member 60. Throughout the plate member 60, the dimension (width) in the width direction (plate width direction) is the dimension W1 described above and is uniform or substantially uniform. Then, throughout the plate member 60, the dimension (thickness) in the thickness direction (plate thickness direction) is the dimension T1 described above and is uniform or substantially uniform. Then, throughout the plate member 60, the hardness is the hardness C1 described above and is uniform or substantially uniform.

The plate member 60 includes parts 61 and 62. The part 62 includes regions 63 and 64. At the time of formation of a connecting lead 20, the regions 63 and 64 are subjected to press work. At this time, from one side in the width direction of the plate member 60, the regions 63 and 64 are pressed. Due to such press work, in the region 63, the dimension (width) in the width direction (plate width direction) is the dimension W2 described above smaller than the dimension W1 and is uniform or substantially uniform. Then, in the region 64, along with approach to the region 63, the dimension of the plate member 60 in the width direction reduces from the dimension W1 to the dimension W2. Due to the press work, in the region 63, the dimension (thickness) in the thickness direction (plate thickness direction) is the dimension T2 described above larger than the dimension T1 and is uniform or substantially uniform. Then, in the region 64, along with approach to the region 63, the dimension of the plate member 60 in the thickness direction increases from the dimension T1 to the dimension T2. Therefore, due to the press work, the plate member 60 is deformed from the shape indicated with the solid line of FIG. 5 to the shape indicated with the broken line of FIG. 5.

Due to the press work to the regions 63 and 64, the regions 63 and 64 are work-hardened. Then, in the region 63, the hardness is the hardness C2 described above higher than the hardness C1 and is uniform or substantially uniform. Then, in the region 64, along with approach to the region 63, the hardness increases from the hardness C1 to the hardness C2. Due to the press work to the regions 63 and 64, for example, a shear plane and a fracture surface are likely to occur inside the region 63 or the like.

After the press work to the regions 63 and 64, the part 62 is bent at a bend position 65 with respect to the part 61 by bending. At this time, the part 62 is bent with respect to the part 61 such that the bend line at the bend position 65 is along the width direction of the plate member 60. Then, the part 62 is bent with respect to the part 61 to one side in the thickness direction of the part 61. Thus, the part 61 forms a top plate portion 31 and the part 62 forms a leg portion 32. In the part 62, the region 63 forms an extension portion 36 and the region 64 forms a profile varying portion 37.

In another example, a top plate portion 31 and a leg portion 32 are formed from mutually different members. Then, such two members are integrated, for example, by welding, to form a connecting lead 20.

For example, as illustrated in FIGS. 2 and 4, in the inner cavity 8 of the battery 1, the respective top plate portions 31 of the connecting leads 20 in pairs are disposed between the electrode group 2 and the electrode holder 23 in the height direction of the battery 1 and are sandwiched between the electrode group 2 and the electrode holder 23. In each of the connecting leads 20, the extending direction (longitudinal direction) of the top plate portion 31 is identical to or substantially identical to the lateral direction of the battery 1, and the width direction (plate width direction) of the top plate portion 31 is identical to or substantially identical to the depth direction of the battery 1. Then, in each of the connecting leads 20, the thickness direction (plate thickness direction) of the top plate portion 31 is identical to or substantially identical to the height direction of the battery 1. In the battery 1, the top plate portion 31 of each of the connecting leads 20 in pairs has the corresponding one of the electrode terminals 16, namely, the corresponding one of the positive electrode terminal and the negative electrode terminal, connected thereto. In each of the connecting leads 20, the through hole 33 of the top plate portion 31 has the corresponding one of the electrode terminals 16, inserted therein. Then, the connecting leads 20 each have the corresponding one of the electrode terminals 16, connected thereto, for example, by swaging fixation at the through hole 33.

In the inner cavity 8 of the battery 1, the leg portion 32 of each of the connecting leads 20 in pairs is disposed between the corresponding one of the side walls 11 and the electrode group 2 in the lateral direction of the battery 1. In each of the connecting leads 20, the width direction of the leg portion 32 is identical to or substantially identical to the depth direction of the battery 1, and the thickness direction of the leg portion 32 (cross direction of the connecting lead 20) is identical to or substantially identical to the lateral direction of the battery 1. In each of the connecting leads 20, the leg portion 32 is disposed outside the through hole 33, namely, outside the connecting position with the corresponding one of the electrode terminals 16, in the lateral direction of the battery 1. Therefore, the top plate portion 31 of each of the connecting leads 20 extends outward in the lateral direction of the battery 1 from the corresponding one of the electrode terminals 16 to the connecting position (extension end E2) with the leg portion 32.

In each of the connecting leads 20, the leg portion 32 is bent with respect to the top plate portion 31 toward the side on which the bottom wall 6 is located in the height direction of the battery 1. The bend line of the leg portion 32 to the top plate portion 31 is along the depth direction of the battery 1.

In each of the connecting leads 20, the extension portion 36 of the leg portion 32 has the corresponding one of the current collecting tabs 13B and 14B, connected thereto. That is, in each of the connecting leads 20, the extension portion 36 has a junction 50 with the corresponding one of the current collecting tabs 13B and 14B. In the present embodiment, the extension portion 36 of each of the connecting leads 20 has the junction 50 on the side face 43. In each of the connecting leads 20, the side face 43 of the extension portion 36 is opposed to the corresponding one of the current collecting tabs 13B and 14B, from one side in the depth direction of the battery 1. In the present embodiment, the current collecting tabs 13B and 14B are each connected to the side face 43 through the backup lead 22. That is, the current collecting tabs 13B and 14B are each joined to the side face 43 with the sheaf portion 15 pinched by the backup lead 22.

In each of the connecting leads 20 according to the present embodiment, the leg portion 32 is bent with respect to the top plate portion 31, with the bend line at the bend position to the top plate portion 31 along the width direction of the top plate portion 31. Then, the width direction of the leg portion 32 is identical to or substantially identical to the width direction of the top plate portion 31. Thus, for example, unlike a structure in which the leg portion is bent with respect to the top plate portion 31 with its bend line along the extending direction (longitudinal direction) of the top plate portion 31, the top plate portion 31 requires no cutout at the connecting position with the leg portion 32 and in the vicinity thereof. Thus, the top plate portion 31 has a large cross-sectional area at the portion to which the leg portion 32 is connected and in the vicinity thereof, namely, at the extension end E2 and in the vicinity thereof. Since the top plate portion 31 has such a large cross-sectional area as described above, the connecting lead 20 has a low electric resistance. Thus, the current path between each of the current collecting tabs 13B and 14B and the corresponding one of the electrode terminals 16 has a low electric resistance.

In each of the connecting leads 20 according to the present embodiment, as described above, the bend line of the leg portion 32 to the top plate portion 31 is along the width direction of the top plate portion 31. Then, in each of the connecting leads 20 disposed in the inner cavity 8, the bend line of the leg portion 32 to the top plate portion 31 is along the depth direction of the battery 1. Thus, even when the electrode group 2 vibrates in the depth direction of the battery 1 (thickness direction of the electrode group 2), for example, due to vibration of machinery equipped with the battery, such as a vehicle, the bend line of the leg portion 32 to the top plate portion 31 is parallel to or substantially parallel to the vibration direction of the electrode group 2. Thus, even when the electrode group 2 vibrates, the connecting leads 20 are each unlikely to be damaged. Therefore, the connecting leads 20 each have a high impact resistance against an impact or the like.

In the present embodiment, the leg portion 32 includes the extension portion 36 provided apart from the bend position to the top plate portion 31. Then, in each of the connecting leads 20, the side face 43, which faces one side in the width direction of the top plate portion 31 on the outer surface of the extension portion 36, has the corresponding one of the current collecting tabs 13B and 14B connected thereto. Thus, even with the leg portion 32 bent with respect to the top plate portion 31 as described above, the workability of joining, to the leg portion 32 of each of the connecting leads 20, the corresponding one of the current collecting tabs 13B and 14B is secured.

In each of the connecting leads 20, the side face 43 is joined to the corresponding one of the current collecting tabs 13B and 14B. Thus, for example, in a case where the electrode group 2 vibrates in the depth direction of the battery 1 (thickness direction of the electrode group 2), the direction of force acting from the electrode group 2 to the connecting leads 20 is identical to or substantially identical to the depth direction of the battery 1. Thus, the force from the electrode group 2 to each of the connecting leads 20 acts in the direction along the bend line of the leg portion 32 to the top plate portion 31. Thus, a further improvement is made in the impact resistance of each of the connecting leads 20 against acting force from the electrode group 2.

In the present embodiment, the dimension W2 of the leg portion 32 in the width direction in the extension portion 36 is smaller than the dimension W1 of the leg portion 32 in the width direction at the connecting position with the top plate portion 31. Due to the smaller dimension W2 of the leg portion 32 in the width direction in the extension portion 36, to the leg portion 32 of each of the connecting leads 20, the corresponding one of the current collecting tabs 13B and 14B is joined more easily.

In the present embodiment, the dimension T2 of the leg portion 32 in the thickness direction in the extension portion 36 is larger than the dimension T1 of the leg portion 32 in the thickness direction at the connecting position with the top plate portion 31. Due to the larger dimension T2 of the leg portion 32 in the thickness direction in the extension portion 36, the side face 43, which is joined to the corresponding one of the current collecting tabs 13B and 14B in each of the connecting leads 20, has a large surface area. Thus, the junction 50 between each of the connecting leads 20 and the corresponding one of the current collecting tabs 13B and 14B has a large contact area. Therefore, the current path between each of the current collecting tabs 13B and 14B and the corresponding one of the electrode terminals 16 has a lower electric resistance, appropriately.

In the present embodiment, in the profile varying portion 37, along with approach to the extension portion 36, the dimension of the leg portion 32 in the width direction reduces gradually. Therefore, the dimension of the leg portion 32 in the width direction does not reduces suddenly from the dimension W1 to the dimension W2. Thus, the current path between each of the current collecting tabs 13B and 14B and the corresponding one of the electrode terminals 16 has a lower electric resistance, appropriately.

Modifications

Figure 6:
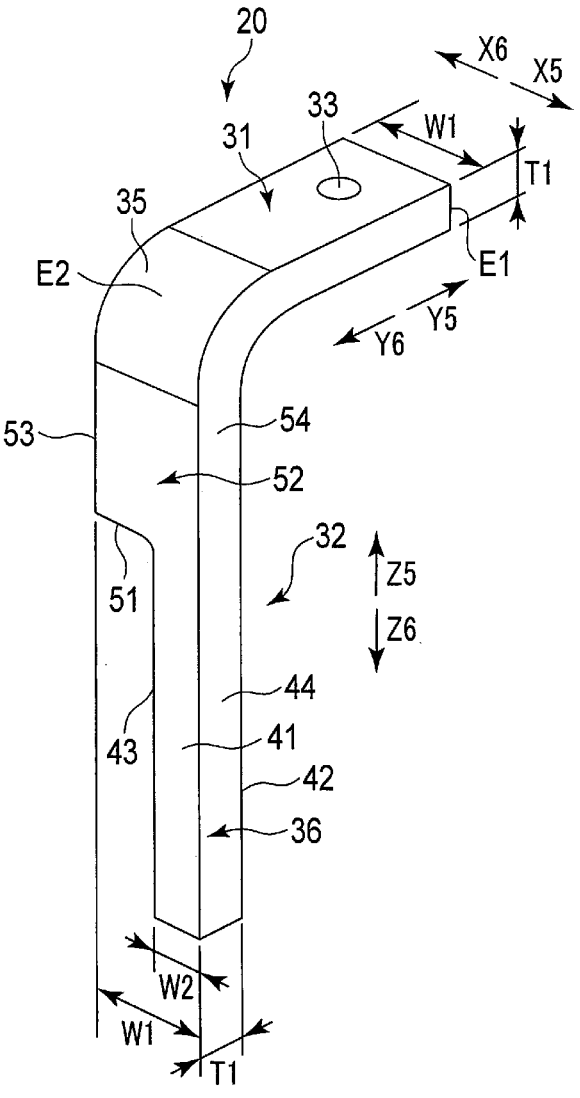
FIG. 6 is a perspective view of the configuration of a connecting lead according to a modification.

Note that, in a modification illustrated in FIG. 6, throughout a connecting lead 20, the dimension (thickness) in the thickness direction is a dimension T1 and uniform or substantially uniform. Thus, the dimension of a leg portion 32 in the thickness direction (cross direction of the connecting lead 20) in an extension portion 36 is identical to or substantially identical to the dimension in the thickness direction of a top plate portion 31. In the present modification, throughout the connecting lead 20, the hardness is hardness C1 and is uniform or substantially uniform. Thus, the hardness of the leg portion 32 in the extension portion 36 is identical to or substantially identical to the hardness of the top plate portion 31.

In the present modification, the leg portion 32 of the connecting lead 20 includes a relay portion 52 as a relay between a leg connecting portion 35 and the extension portion 36. In the present modification, a step face 51 is formed at the connecting position of the extension portion 36 to the relay portion 52, namely, at the boundary position between the extension portion 36 and the relay portion 52. The relay portion 52 includes a pair of relay side faces 53 and 54. The relay side face (first relay side face) 53 faces the side that a side face 43 faces in the width direction of the leg portion 32. The relay side face (second relay side face) 54 is adjacent to a side face 44, on the side on which the top plate portion 31 is located. The relay side face 54 faces the side opposite to the side that the relay side face 53 faces in the width direction of the leg portion 32. Then, the relay side face 54 is disposed apart from the relay side face 53 in the width direction of the leg portion 32. The relay side faces 53 and 54 each extend parallel to or substantially parallel to the thickness direction of the top plate portion 31.

One end of the step face 51 is connected to the relay side face 53 of the relay portion 52 and the other end of the step face 51 is connected to the side face 43 of the extension portion 36. The step face 51 extends from the relay side face 53 to the side face 43 along the width direction of the leg portion 32 (width direction of the top plate portion 31). Due to the step face 51, a step is formed between the relay side face 53 and the side face 43. Due to the step based on the step face 51, the side face 43 is disposed closer to the side on which the relay side face 54 and the side face 44 are located than the relay side face 53 is, in the width direction of the leg portion 32. For example, no step is formed between the relay side face 54 and the side face 44, and thus the relay side face 54 and the side face 44 are disposed so as to be flush with or substantially flush with each other.

In the present modification, the dimension (width) of the top plate portion 31 in the width direction is a dimension (first dimension) W1 and is uniform or substantially uniform. Then, in the leg portion 32, the dimension (width) in the width direction (width direction of the top plate portion 31) is the dimension W1 and is uniform or substantially uniform between the leg connecting portion 35 and the step face 51. Therefore, at the bend position of the leg portion 32 to the top plate portion 31, the leg portion 32 has a size identical to or substantially identical to the dimension (first dimension) W1, in the width direction of the top plate portion 31 (width direction of the leg portion 32). Then, in the extension portion 36, the dimension (width) of the leg portion 32 in the width direction (width direction of the top plate portion 31) is a dimension (second dimension) W2 smaller than the dimension (first dimension) W1 and is uniform or substantially uniform.

In the present modification, for formation of the extension portion 36 of the connecting lead 20, no press work is required. Thus, a portion for formation of the extension portion 36 is subjected to no work hardening in manufacture for the connecting lead 20. In another example, a plate member may be formed by forging such that the width of a portion for formation of the extension portion 36 is smaller than the width of the other portion.

For example, in the embodiment described above, on the outer surface of the leg portion 32, the side face (side faces 44 and 48 in the first embodiment) on the side opposite to the side of formation of the junction 50 with the current collecting tab (13B or 14B) is formed, from the leg connecting portion 35 to the protrusion end, parallel to or substantially parallel to the thickness direction of the top plate portion 31, but this is not limiting. In a modification, the relay portion between the leg connecting portion 35 and the extension portion 36 may have an inclined face on the side face on the side opposite to the side of formation of the junction 50 with the current collecting tab (13B or 14B). In this case, the inclined face is oblique with respect to the thickness direction of the top plate 31 such that a closer part to the extension portion 36 is closer to the side face on the side of formation of the junction 50.

In another modification, the relay portion between the leg connecting portion 35 and the extension portion 36 may have a step face, similar to the step face 51, on the side face on the side opposite to the side of formation of the junction 50 with the current collecting tab (13B or 14B). In this case, due to the step based on the step face, the portion closer to the extension portion 36 is closer to the side face on the side of formation of the junction 50 than the portion farther from the extension portion 36 is.

In any of the modifications described above, for example, similarly to the first embodiment, the connecting lead 20 includes the top plate portion 31 and the leg portion 32 bent with respect to the top plate portion 31 to one side in the thickness direction of the top plate portion 31. Then, the width direction of the leg portion 32 is identical to or substantially identical to the width direction of the top plate portion 31. Thus, for example, the top plate portion 31 requires no cutout at the connecting position with the leg portion 32 and in the vicinity thereof. Thus, the top plate portion 31 has a large cross-sectional area at the portion to which the leg portion 32 is connected and in the vicinity thereof, namely, at the extension end E2 and in the vicinity thereof. Therefore, in any of the modifications, the connecting lead 20 has a low electric resistance, so that the current path between each of the current collecting tabs 13B and 14B and the corresponding one of the electrode terminals 16 has a low electric resistance.

In any of the modifications described above, the bend line of the leg portion 32 to the top plate portion 31 is along the width direction of the top plate portion 31. Then, in each of the connecting leads 20 disposed in the inner cavity 8, the bend line of the leg portion 32 to the top plate portion 31 is along the depth direction of the battery 1. Thus, in any of the modifications, even when the electrode group 2 vibrates in the depth direction of the battery 1 (thickness direction of the electrode group 2), the bend line of the leg portion 32 to the top plate portion 31 is parallel to or substantially parallel to the vibration direction of the electrode group 2. Thus, even when the electrode group 2 vibrates, the connecting leads 20 are each unlikely to be damaged. Therefore, in any of the modifications, for example, similarly to the first embodiment, the connecting leads 20 each have a high impact resistance against an impact or the like.

Note that both of the positive-electrode-side connecting lead between the positive electrode current collecting tab 13B and the positive electrode terminal and the negative-electrode-side connecting lead between the negative electrode current collecting tab 14B and the negative electrode terminal are not necessarily similar in configuration to the connecting lead 20 according to any of the embodiment and modifications described above. That is, at least either the positive-electrode-side connecting lead or the negative-electrode-side connecting lead is required to be similar in configuration to the connecting lead 20 according to any of the embodiment and modifications described above.

According to at least one of the embodiments and examples, in the connecting lead, the bend line at the bend position to the top plate portion is along the width direction of the top plate portion. The leg portion includes the extension portion located apart from the bend position to the top plate portion, and the extension portion includes the side face faces one side in the width direction of the top plate portion. The side face of the extension portion is joined to a current collecting tab. Thus, provided can be the connecting lead having a high impact resistance and having a low electric resistance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A connecting lead establishing a connection between a current collecting tab of an electrode group and an electrode terminal in a battery, the connecting lead comprising:

a top plate portion; and a leg portion bent with respect to the top plate portion to one side in a thickness direction of the top plate portion, wherein the top plate portion includes top plate edge faces provided in both ends in a width direction of the top plate portion, the edge faces forming a thickness of the top plate portion, the leg portion includes an extension portion located apart from the top plate portion, the extension portion includes:

a first main face on an outer surface, the first main face facing one side in a cross direction intersecting both the width direction of the top plate portion and the thickness direction of the top plate portion;

a second main face on the outer surface, the second main face facing a side opposite to the side that the first main face faces; and a side face on the outer surface, the side face serving as a relay between the first main face and the second main face, the side face facing one side in the width direction of the top plate portion, the side face being joined to the current collecting tab, and a continuous surface part which faces an outer side in the width direction of the top plate portion is formed in a region from one of the top plate edge faces of the top plate portion to the side face of the extension portion, the continuous surface part extending with no bend except for a leg connecting portion in which the leg portion is connected to the top plate portion, wherein the leg portion at the leg connecting portion to the top plate portion has a first dimension in the width direction of the top plate portion, the leg portion in the extension portion has a second dimension smaller than the first dimension in the width direction of the top plate portion, the top plate portion has a third dimension in the thickness direction, the extension portion of the leg portion has a fourth dimension larger than the third dimension, as a dimension between the first main face and the second main face, and the leg portion includes a dimension varying portion provided between the leg connecting portion to the top plate portion and the extension portion, the dimension varying portion having a closer part to the extension portion such that the closer part has a larger dimension in the cross direction.

2. The connecting lead according to claim 1, wherein the leg portion includes a width varying portion provided between the leg connecting portion to the top plate portion and the extension portion, the width varying portion having a closer part to the extension portion such that the closer part has a smaller dimension in the width direction of the top plate portion.

3. The connecting lead according to claim 1, wherein the top plate portion has a first hardness, and the leg portion at the extension portion has a second hardness higher than the first hardness.

4. The connecting lead according to claim 1, wherein the leg portion extends straight from the leg connecting portion to the top plate portion, and the top plate portion extends straight to a protrusion end with respect to the top plate portion.

5. A battery comprising:

the connecting lead according to claim 1;

a container including a bottom wall and a surrounding wall, the container having an inner cavity in which the connecting lead is disposed, the inner cavity being defined by the bottom wall and the surrounding wall;

an electrode group including a positive electrode and a negative electrode, the electrode group including a current collecting tab joined to the connecting lead through the side face of the extension portion of the leg portion;

a lid member attached to the surrounding wall through an end portion opposite the bottom wall, the lid member covering an opening of the inner cavity of the container; and an electrode terminal attached to an outer surface of the lid member, the electrode terminal being connected to the top plate portion of the connecting lead.

6. The battery according to claim 5, wherein the current collecting tab includes: a positive electrode current collecting tab protruding from the electrode group; and a negative electrode current collecting tab protruding from the electrode group to a side opposite to a side to which the positive electrode current collecting tab protrudes, the electrode terminal includes a positive electrode terminal and a negative electrode terminal, and the connecting lead establishes at least either a connection between the positive electrode current collecting tab and the positive electrode terminal or a connection between the negative electrode current collecting tab and the negative electrode terminal.

\* \* \* \* \*